United States Patent
Trombetta et al.

(10) Patent No.: US 10,154,752 B2
(45) Date of Patent: Dec. 18, 2018

(54) CAPSULE HOUSING

(71) Applicant: 2266170 Ontario Inc., Mississauga (CA)

(72) Inventors: Liberatore A. Trombetta, Ancaster (CA); YuCheng Fu, Guelph (CA); Christopher Douglas Meffen, Bolton (CA)

(73) Assignee: 2266170 Ontario Inc., Mississauga (CA)

( * ) Notice: Subject to any disclaimer, the term of this patent is extended or adjusted under 35 U.S.C. 154(b) by 489 days.

(21) Appl. No.: 14/285,963

(22) Filed: May 23, 2014

(65) Prior Publication Data

US 2014/0345471 A1 Nov. 27, 2014

Related U.S. Application Data

(60) Provisional application No. 61/826,777, filed on May 23, 2013.

(51) Int. Cl.
*A47J 31/40* (2006.01)
*A47J 31/06* (2006.01)

(52) U.S. Cl.
CPC ......... *A47J 31/407* (2013.01); *A47J 31/0647* (2013.01)

(58) Field of Classification Search
CPC ............... A47J 31/0642; A47J 31/0647; A47J 31/0673; A47J 31/0678; A47J 31/40; A47J 31/407; A47J 31/4482
USPC ......................................... 99/284, 295, 323
See application file for complete search history.

(56) References Cited

U.S. PATENT DOCUMENTS

| | | | |
|---|---|---|---|
| 2,113,715 A | 4/1938 | Wilcox |
| 2,987,221 A | 6/1961 | Milton |
| 3,110,121 A | 11/1963 | Corrinet |
| 3,282,703 A | 11/1966 | Broadhurst |
| 3,399,806 A | 9/1968 | Lucas |
| 3,713,936 A | 1/1973 | Ramsay |
| 4,101,627 A | 7/1978 | Menier |
| 4,131,064 A | 12/1978 | Ryan et al. |
| 4,220,673 A | 9/1980 | Strobel |
| 4,235,160 A | 11/1980 | Olney et al. |
| 4,306,367 A | 12/1981 | Otto |
| 4,440,796 A | 4/1984 | Lunder et al. |

(Continued)

FOREIGN PATENT DOCUMENTS

| | | |
|---|---|---|
| CA | 2012891 | 9/1991 |
| CA | 2516417 A1 | 9/2004 |

(Continued)

OTHER PUBLICATIONS

Internationals Search Report & Written Opinion in PCT/CA2014/050477 dated Aug. 6, 2014.

*Primary Examiner* — Dana Ross
*Assistant Examiner* — Kuangyue Chen
(74) *Attorney, Agent, or Firm* — Manelli Selter PLLC; Edward J. Stemberger

(57) ABSTRACT

A capsule housing is provided for use in a machine for preparing a desired product from capsules. The capsule housing includes a capsule containment portion, a product collection portion and a product dispensing portion. A dispensing system is disposed in the capsule housing for dispensing product prepared from the capsule. An adjustment system is disposed in the capsule housing for accommodating different sizes of capsules.

13 Claims, 11 Drawing Sheets

(56) References Cited

U.S. PATENT DOCUMENTS

| | | |
|---|---|---|
| 4,471,689 A | 9/1984 | Piana |
| 4,518,639 A | 5/1985 | Phillips |
| 4,559,729 A | 12/1985 | White |
| 4,619,830 A | 10/1986 | Napier |
| 4,701,365 A | 10/1987 | Iwaski |
| 4,728,425 A | 3/1988 | Sandvig |
| 4,859,337 A | 8/1989 | Woltermann |
| 4,865,737 A | 9/1989 | McMichael |
| 4,867,993 A | 9/1989 | Nordskog |
| 4,981,588 A | 1/1991 | Poulallion |
| 4,983,410 A | 1/1991 | Dinos |
| 4,995,310 A | 2/1991 | van der Lijn et al. |
| 4,996,066 A | 2/1991 | Love et al. |
| 5,008,013 A | 4/1991 | Favre et al. |
| 5,076,433 A | 12/1991 | Howes |
| 5,298,267 A | 3/1994 | Gruenbacher |
| 5,331,793 A | 7/1994 | Pophal et al. |
| 5,390,587 A | 2/1995 | Wu |
| 5,447,631 A | 9/1995 | Mahlich |
| 5,456,929 A | 10/1995 | Mifune et al. |
| 5,496,573 A | 3/1996 | Tsuji et al. |
| 5,536,290 A | 7/1996 | Stark et al. |
| 5,575,383 A | 11/1996 | Seeley |
| 5,601,716 A | 2/1997 | Heinrich et al. |
| 5,605,710 A | 2/1997 | Prindonoff et al. |
| 5,738,786 A | 4/1998 | Winnington-Ingram |
| 5,806,582 A | 9/1998 | Howes |
| 5,840,189 A | 11/1998 | Sylvan et al. |
| 5,858,437 A | 1/1999 | Anson |
| 5,866,185 A | 2/1999 | Burkett |
| 5,871,096 A | 2/1999 | Yakich |
| 5,871,644 A | 2/1999 | Simon et al. |
| 5,882,716 A | 3/1999 | Munz-Schaerer et al. |
| 5,885,314 A | 3/1999 | Oussoren et al. |
| 5,895,672 A | 4/1999 | Cooper |
| 5,896,686 A | 4/1999 | Howes |
| 5,897,899 A | 4/1999 | Fond |
| 5,923,242 A | 7/1999 | Slagle et al. |
| 5,957,279 A | 9/1999 | Howes |
| 5,971,195 A | 10/1999 | Reidinger et al. |
| 6,025,000 A | 2/2000 | Fond et al. |
| 6,146,270 A | 11/2000 | Huard et al. |
| 6,189,438 B1 | 2/2001 | Bielfeldt et al. |
| 6,220,147 B1 | 4/2001 | Priley |
| 6,223,937 B1 | 5/2001 | Schmidt |
| 6,308,721 B1 * | 10/2001 | Bock .................. A61M 1/1656 134/166 R |
| 6,440,256 B1 | 8/2002 | Gordon et al. |
| 6,514,555 B1 | 2/2003 | Fayard et al. |
| 6,548,433 B1 | 4/2003 | Gbur et al. |
| 6,557,597 B2 | 5/2003 | Riesterer |
| 6,561,232 B1 | 5/2003 | Frutin |
| 6,589,577 B2 | 7/2003 | Lazaris et al. |
| 6,607,762 B2 | 7/2003 | Lazaris et al. |
| 6,622,615 B2 | 9/2003 | Heczko |
| 6,644,173 B2 | 11/2003 | Lazaris et al. |
| 6,645,537 B2 | 11/2003 | Sweeney et al. |
| 6,655,260 B2 * | 12/2003 | Lazaris ............... A47J 31/0668 99/295 |
| 6,658,989 B2 | 12/2003 | Sweeney et al. |
| 6,720,070 B2 | 4/2004 | Hamaguchi et al. |
| 6,758,130 B2 | 7/2004 | Sargent et al. |
| 6,810,788 B2 | 11/2004 | Hale |
| 6,841,185 B2 | 1/2005 | Sargent et al. |
| 6,854,378 B2 | 2/2005 | Jarisch et al. |
| 6,869,627 B2 | 3/2005 | Perkovic et al. |
| 6,913,777 B2 | 7/2005 | Rebhorn et al. |
| 6,959,832 B1 | 11/2005 | Sawada |
| 6,992,586 B2 | 1/2006 | Rosenfeld |
| 7,067,038 B2 | 6/2006 | Trokhan et al. |
| 7,153,530 B2 | 12/2006 | Masek et al. |
| 7,279,188 B2 | 10/2007 | Arrick et al. |
| 7,311,209 B2 | 12/2007 | Bentz et al. |
| 7,325,479 B2 | 2/2008 | Laigneau et al. |
| 7,328,651 B2 | 2/2008 | Halliday et al. |
| 7,387,063 B2 | 6/2008 | Vu et al. |
| 7,412,921 B2 | 8/2008 | Hu et al. |
| 7,490,542 B2 | 2/2009 | Macchi et al. |
| 7,543,527 B2 | 6/2009 | Schmed |
| 7,552,672 B2 | 6/2009 | Schmed |
| 7,552,673 B2 | 6/2009 | Levin |
| 7,624,673 B2 | 6/2009 | Zanetti |
| 7,594,470 B2 | 9/2009 | Scarchilli et al. |
| 7,640,842 B2 | 1/2010 | Bardazzi |
| 7,681,492 B2 | 3/2010 | Suggi et al. |
| 7,685,930 B2 | 3/2010 | Mandralis et al. |
| 7,698,992 B2 | 4/2010 | Wei |
| 7,763,300 B2 | 7/2010 | Sargent et al. |
| 7,798,055 B2 | 9/2010 | Mandralis et al. |
| 7,854,192 B2 | 12/2010 | Denisart et al. |
| 7,856,920 B2 | 12/2010 | Schmed et al. |
| 7,856,921 B2 | 12/2010 | Arrick et al. |
| 7,910,145 B2 | 3/2011 | Reati |
| 8,062,682 B2 | 11/2011 | Mandralis et al. |
| 8,225,771 B2 | 7/2012 | Andre |
| 8,286,547 B1 | 10/2012 | Lassota |
| 8,361,527 B2 | 1/2013 | Winkler et al. |
| 8,409,646 B2 | 4/2013 | Yoakim et al. |
| 8,425,957 B2 | 4/2013 | Steenhof |
| 8,474,368 B2 | 7/2013 | Kilber et al. |
| 8,475,854 B2 | 7/2013 | Skalski et al. |
| 8,481,097 B2 | 7/2013 | Skalski et al. |
| 8,573,114 B2 | 11/2013 | Huang et al. |
| 8,591,978 B2 | 11/2013 | Skalski et al. |
| 8,673,379 B2 | 3/2014 | Skalski et al. |
| 8,740,020 B2 | 6/2014 | Marina et al. |
| 8,834,948 B2 | 9/2014 | Estabrook et al. |
| 8,960,078 B2 | 2/2015 | Hristov et al. |
| 2002/0020659 A1 | 2/2002 | Sweeney et al. |
| 2003/0005826 A1 | 1/2003 | Sargent et al. |
| 2003/0039731 A1 | 2/2003 | Dalton et al. |
| 2003/0087005 A1 | 5/2003 | Baron |
| 2005/0016383 A1 | 1/2005 | Kirschner et al. |
| 2005/0051478 A1 | 3/2005 | Karanikos et al. |
| 2005/0287251 A1 | 12/2005 | Lazaris et al. |
| 2006/0174769 A1 * | 8/2006 | Favre .................. A47J 31/0668 99/275 |
| 2006/0236871 A1 | 10/2006 | Ternite et al. |
| 2006/0246187 A1 | 11/2006 | Egolf et al. |
| 2007/0144356 A1 | 6/2007 | Rivera |
| 2007/0148290 A1 | 6/2007 | Ternite |
| 2007/0275125 A1 | 11/2007 | Catani |
| 2008/0015098 A1 | 1/2008 | Littlejohn et al. |
| 2008/0142115 A1 | 6/2008 | Vogt et al. |
| 2008/0156196 A1 | 7/2008 | Doglioni et al. |
| 2008/0202075 A1 | 8/2008 | Kronawittleithner et al. |
| 2008/0245236 A1 | 10/2008 | Ternite et al. |
| 2009/0110775 A1 | 4/2009 | Rijskamp et al. |
| 2009/0133584 A1 | 5/2009 | De Graaff et al. |
| 2009/0165228 A1 | 7/2009 | Kilkenny |
| 2009/0175986 A1 | 7/2009 | Doglioni Majer |
| 2009/0186141 A1 | 7/2009 | Almblad et al. |
| 2009/0206084 A1 | 8/2009 | Woolf et al. |
| 2009/0211458 A1 | 8/2009 | Denisart et al. |
| 2009/0260690 A1 | 10/2009 | Bell |
| 2009/0283467 A1 * | 11/2009 | Wallerstorfer ........ A47J 31/605 210/233 |
| 2009/0311389 A1 | 12/2009 | Zoss et al. |
| 2009/0324791 A1 | 12/2009 | Ohresser et al. |
| 2010/0003379 A1 | 1/2010 | Zoss et al. |
| 2010/0028495 A1 | 2/2010 | Novak et al. |
| 2010/0116772 A1 | 5/2010 | Teys |
| 2010/0215808 A1 | 8/2010 | Versini |
| 2010/0239733 A1 | 9/2010 | Yoakim et al. |
| 2010/0303964 A1 | 12/2010 | Beaulieu et al. |
| 2011/0003040 A1 | 1/2011 | Graf et al. |
| 2011/0033580 A1 | 2/2011 | Bieshuevel et al. |
| 2011/0041469 A1 | 2/2011 | Hale |
| 2011/0045144 A1 | 2/2011 | Boussemart et al. |
| 2011/0076361 A1 | 3/2011 | Peterson et al. |
| 2011/0183048 A1 | 7/2011 | Noble et al. |
| 2011/0185911 A1 | 8/2011 | Rapparini |
| 2011/0247975 A1 | 10/2011 | Rapparini |

(56) References Cited

U.S. PATENT DOCUMENTS

| | | | |
|---|---|---|---|
| 2011/0274802 A1* | 11/2011 | Rivera | A47J 31/0668 426/431 |
| 2012/0006205 A1 | 1/2012 | Vanni | |
| 2012/0024160 A1 | 2/2012 | Van et al. | |
| 2012/0052163 A1 | 3/2012 | Doleac et al. | |
| 2012/0070542 A1 | 3/2012 | Camera et al. | |
| 2012/0097602 A1 | 4/2012 | Tedford | |
| 2012/0121764 A1 | 5/2012 | Lai et al. | |
| 2012/0171334 A1 | 7/2012 | Yoakim | |
| 2012/0174794 A1 | 7/2012 | Fraij | |
| 2012/0180670 A1 | 7/2012 | Yoakim | |
| 2012/0180671 A1 | 7/2012 | Baudet | |
| 2012/0183649 A1 | 7/2012 | Burkhalter | |
| 2012/0186457 A1 | 7/2012 | Ozanne | |
| 2012/0196008 A1 | 8/2012 | York | |
| 2012/0199007 A1 | 8/2012 | Larzul | |
| 2012/0199010 A1 | 8/2012 | Mariller | |
| 2012/0199011 A1 | 8/2012 | Cheng | |
| 2012/0201933 A1 | 8/2012 | Dran et al. | |
| 2012/0207893 A1 | 8/2012 | Kreuger | |
| 2012/0207894 A1 | 8/2012 | Webster | |
| 2012/0210876 A1 | 8/2012 | Glucksman | |
| 2012/0210878 A1 | 8/2012 | Mariller | |
| 2012/0210879 A1 | 8/2012 | Mariller | |
| 2012/0231123 A1 | 9/2012 | Kamerbeek | |
| 2012/0231124 A1 | 9/2012 | Kamerbeek | |
| 2012/0231126 A1 | 9/2012 | Lo Faro | |
| 2012/0231133 A1 | 9/2012 | Kamerbeek | |
| 2012/0251668 A1 | 10/2012 | Wong | |
| 2012/0251669 A1 | 10/2012 | Kamerbeek | |
| 2012/0251670 A1 | 10/2012 | Kamerbeek | |
| 2012/0251671 A1 | 10/2012 | Kamerbeek | |
| 2012/0251692 A1 | 10/2012 | Kamerbeek | |
| 2012/0251693 A1 | 10/2012 | Kamerbeek | |
| 2012/0251694 A1 | 10/2012 | Kamerbeek | |
| 2012/0258204 A1 | 10/2012 | Tsuji | |
| 2012/0258210 A1 | 10/2012 | Wong | |
| 2012/0258219 A1 | 10/2012 | Wong | |
| 2012/0258221 A1 | 10/2012 | Wong | |
| 2012/0260806 A1 | 10/2012 | Rolfes | |
| 2012/0263829 A1 | 10/2012 | Kamerbeek | |
| 2012/0263830 A1 | 10/2012 | Kamerbeek | |
| 2012/0263833 A1 | 10/2012 | Wong | |
| 2012/0266755 A1 | 10/2012 | Baudet | |
| 2012/0269933 A1 | 10/2012 | Rapparini | |
| 2012/0272830 A1 | 11/2012 | Gugerli | |
| 2012/0276252 A1 | 11/2012 | Bunke | |
| 2012/0276255 A1 | 11/2012 | Verbeek | |
| 2012/0297987 A1 | 11/2012 | Lee | |
| 2012/0301581 A1 | 11/2012 | Abegglen | |
| 2012/0307024 A1 | 12/2012 | Howes | |
| 2012/0308688 A1 | 12/2012 | Peterson | |
| 2012/0312174 A1 | 12/2012 | Lambert | |
| 2012/0321755 A1 | 12/2012 | Macaulay | |
| 2012/0321756 A1 | 12/2012 | Estabrook et al. | |
| 2012/0328739 A1 | 12/2012 | Nocera | |
| 2012/0328740 A1 | 12/2012 | Nocera | |
| 2012/0328744 A1 | 12/2012 | Nocera | |
| 2013/0004629 A1 | 1/2013 | Clark | |
| 2013/0004637 A1 | 1/2013 | Gugerli | |
| 2013/0008316 A1 | 1/2013 | Hoeglauer | |
| 2013/0011521 A1 | 1/2013 | Weijers et al. | |
| 2013/0017303 A1 | 1/2013 | Vu | |
| 2013/0025466 A1 | 1/2013 | Fu | |
| 2013/0032034 A1 | 2/2013 | Jarisch | |
| 2013/0047863 A1 | 2/2013 | Larzul | |
| 2013/0059039 A1 | 3/2013 | Trombetta | |
| 2013/0059903 A1 | 3/2013 | Deuber | |
| 2013/0068109 A1 | 3/2013 | Pribus et al. | |
| 2013/0084368 A1 | 4/2013 | Linck et al. | |
| 2013/0095219 A1 | 4/2013 | de Graaff et al. | |
| 2013/0115342 A1 | 5/2013 | Van et al. | |
| 2013/0122153 A1 | 5/2013 | Ferrier et al. | |
| 2013/0122167 A1 | 5/2013 | Winkler et al. | |
| 2013/0142931 A1 | 6/2013 | Fin et al. | |
| 2013/0259982 A1 | 10/2013 | Abegglen et al. | |
| 2013/0340626 A1 | 12/2013 | Oh | |
| 2013/0344205 A1 | 12/2013 | Oh | |
| 2014/0013958 A1 | 1/2014 | Krasne et al. | |
| 2014/0037802 A1 | 2/2014 | Cardoso | |
| 2014/0099388 A1 | 4/2014 | Wang et al. | |
| 2015/0050391 A1 | 2/2015 | Rapparini | |
| 2015/0059588 A1* | 3/2015 | Castellani | A47J 31/0647 99/295 |

FOREIGN PATENT DOCUMENTS

| | | |
|---|---|---|
| CA | 2689804 A1 | 3/2008 |
| CA | 2686347 A1 | 12/2008 |
| CA | 2807489 | 2/2012 |
| CA | 2824199 A1 | 8/2012 |
| CA | 2759782 A1 | 11/2012 |
| CA | 2801236 A1 | 3/2013 |
| CN | 202537195 | 11/2012 |
| CN | 202960136 | 6/2013 |
| EP | 0047169 A2 | 3/1982 |
| EP | 0145499 | 6/1985 |
| EP | 0432126 A1 | 6/1991 |
| EP | 1208782 | 8/2004 |
| EP | 1859683 | 11/2007 |
| EP | 2230195 | 9/2010 |
| EP | 2409608 | 1/2012 |
| FR | 2930522 A1 | 10/2009 |
| GB | 803486 A | 10/1958 |
| GB | 962038 | 6/1964 |
| GB | 2074838 | 11/1981 |
| JP | 662737 | 3/1994 |
| JP | 11171249 A | 6/1999 |
| KR | 20140031693 | 3/2014 |
| WO | 0145616 A1 | 6/2001 |
| WO | 03082065 A1 | 10/2003 |
| WO | 2004083071 A1 | 9/2004 |
| WO | 2009114119 | 9/2009 |
| WO | 2010013146 A2 | 2/2010 |
| WO | 2010066705 | 6/2010 |
| WO | 2010085824 | 8/2010 |
| WO | 2011095518 | 8/2010 |
| WO | 201006516 A1 | 9/2010 |
| WO | 2010137956 A1 | 12/2010 |
| WO | 2012031106 A1 | 3/2012 |
| WO | 2012069505 | 5/2012 |
| WO | 2014056862 | 4/2014 |
| WO | 2014112556 | 12/2014 |

* cited by examiner

CAPSULE HOUSING

FIELD

This specification relates to machines that are adapted to prepare consumable products from capsules and in particular to housings adapted for receiving capsules for such machines.

BACKGROUND

The following background discussion is not an admission that anything discussed below is citable as prior art or common general knowledge. The documents listed below are incorporated herein in their entirety by this reference to them.

Machines for preparing products, such as beverages like coffee or tea, from single use capsules are becoming increasingly popular. Such machines typically include a brew chamber having a capsule housing that is adapted for receiving a specific capsule. The capsule is supported within the capsule housing while a fluid such as hot water is injected into the capsule to mix with ingredients contained within the capsule. A resulting prepared product is subsequently dispensed from the capsule into a desired receptacle such as a cup or bowl.

A problem with such machines is that the capsule housing is only adapted to receive one specific size or shape of capsule. This limits the options available to consumers to prepare a desired product. Accommodating multiple capsule sizes or shapes is a challenge since the capsule housing requires sufficiently close tolerances to support the capsule during injection of fluid and extraction of the prepared product.

Another problem with such machines is that the capsule housing is not adapted to receive larger volume capsules. This limits the options available to consumers to prepare products having a larger volume of required ingredients (such as products with noodles or other insoluble consumable ingredients).

It is desirable to provide a capsule housing that is adapted to receive larger volume capsules and preferably multiple capsule sizes or shapes while maintaining the close tolerances required to adequately support each capsule.

SUMMARY

In one aspect the invention provides a capsule housing for a machine that prepares a product from a capsule, the capsule housing comprising:
  a capsule containment portion defining a cavity adapted for receiving a capsule;
  a product dispensing portion defining an opening adapted for dispensing product from said capsule housing to a desired receptacle;
  a dispensing system adapted for piercing a capsule to dispense product from said capsule to said product dispensing portion; and
  an adjustment system adapted to adjust one or more dimensions of said capsule containment portion.

In another aspect, the invention provides a capsule housing for a machine that prepares a product from a capsule, the capsule housing comprising:
  an attachment structure for removably attaching said capsule housing to a support structure disposed on the machine;
  a capsule containment portion defining a cavity adapted for receiving a capsule;
  a product dispensing portion defining an opening adapted for dispensing product from said capsule housing to a desired receptacle; and
  a dispensing system adapted for piercing a capsule to dispense product from said capsule to said product dispensing portion.

Other aspects and features of the teachings disclosed herein will become apparent, to those ordinarily skilled in the art, upon review of the following description of the specific examples of the specification.

A DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

A capsule housing in accordance with the present invention is shown generally at 10 in the Figures.

Figure 1:
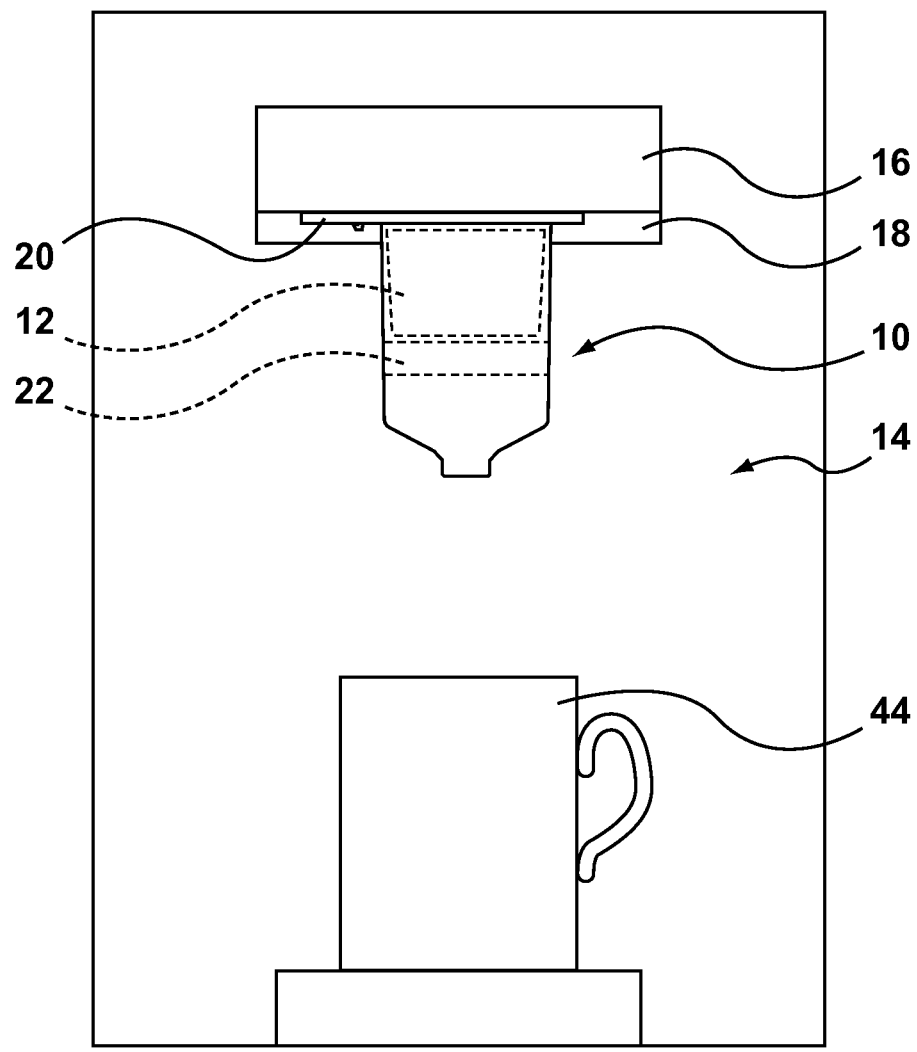
FIG. 1 is a schematic view of a capsule housing in accordance with the present invention disposed in a machine for preparing a desired product from capsules.

Capsule housing 10 is adapted to receive a capsule 12 for preparing a desired product in a machine 14 (as shown schematically in FIG. 1). Machine 14 includes a brew chamber having an injection system 16 for injecting a desired fluid, such as water, into capsule 12 for preparing a desired product. Machine 14 further includes a support structure 18 that is adapted to support capsule housing 10.

Figure 4:
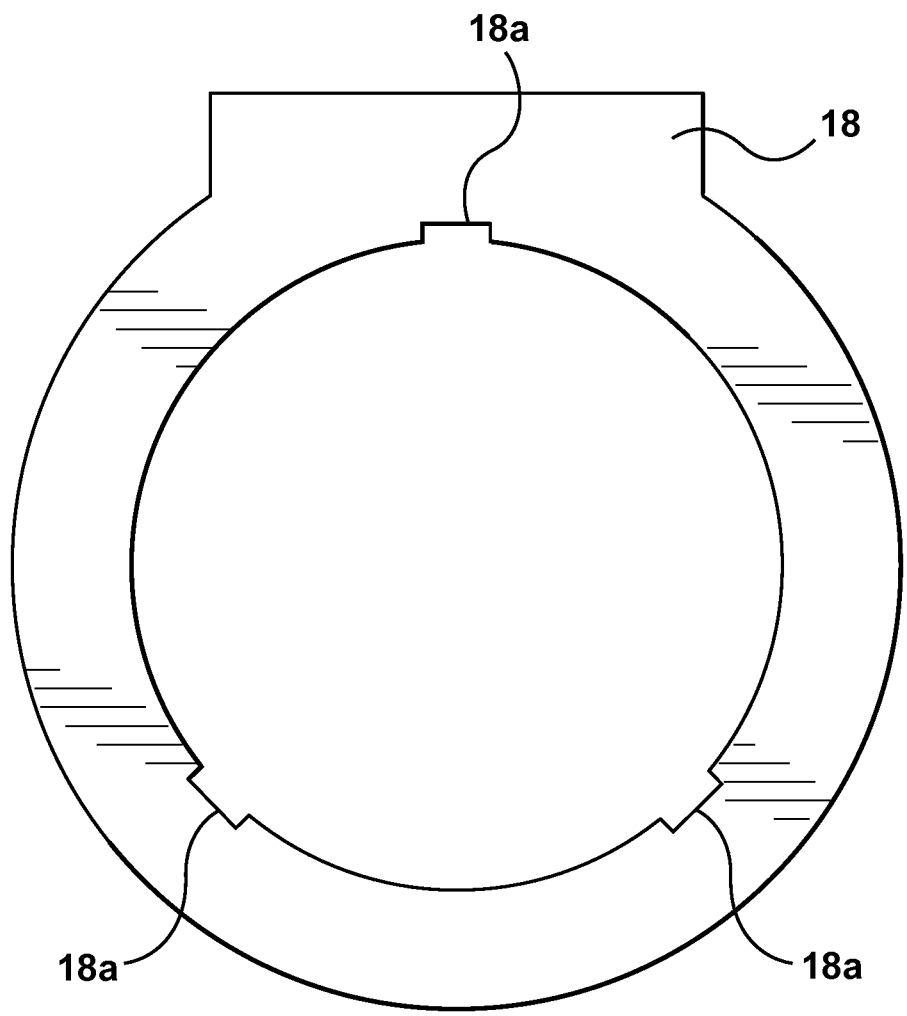
FIG. 4 is a top view of the support structure disposed in a machine for receiving the capsule housing of FIG. 1.

Capsule housing 10 includes an attachment structure 20 for attaching capsule housing 10 to support structure 18. Attachment structure 20 may include a collar 20a with one or more spring biased tabs 20b that are adapted to be removably disposed within corresponding slots 18a defined in support structure 18 (see FIG. 4).

A dispensing system 22 may be disposed in capsule housing 10 for dispensing product from capsule 12. Dispensing system 22 may comprise a hollow probe 22a that is adapted to pierce capsule 12.

Capsule housing 10 comprises a hollow body having a capsule containment portion 24, a product collection portion 26 and a product dispensing portion 28.

Capsule containment portion 24 has a side wall 30 that defines a cavity 32 for receiving capsule 12. Capsule containment portion 24 may further include a seat 34 for supporting a first portion of capsule 12 within interior space 20 and a base 36 for supporting a second portion of capsule 10 within capsule containment portion 24.

Product collection portion 26 has a side wall 38 that defines a chamber 40 for collecting product that is prepared from capsule 12. Side wall 38 tapers inwardly from capsule containment portion 24 to direct product to product dispensing portion 28. Chamber 40 has a sufficient volume to allow product to flow from capsule 12 through product dispensing portion 28 without backup or over flow of product.

Product dispensing portion 28 defines an aperture 42 for dispensing product into a desired receptacle 44 such as a cup or bowl. Product dispensing portion 28 may include a sidewall 46 defining a cylindrical passage.

Figure 2:
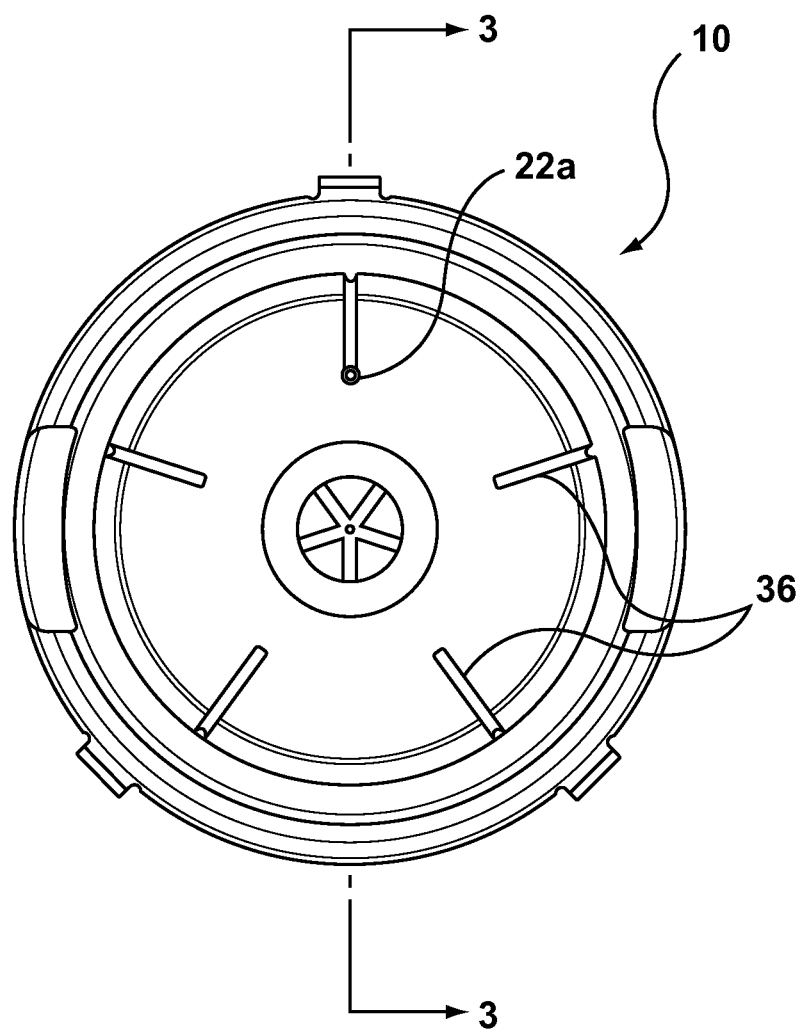
FIG. 2 is a top view of the capsule housing of FIG. 1.
Figure 3:
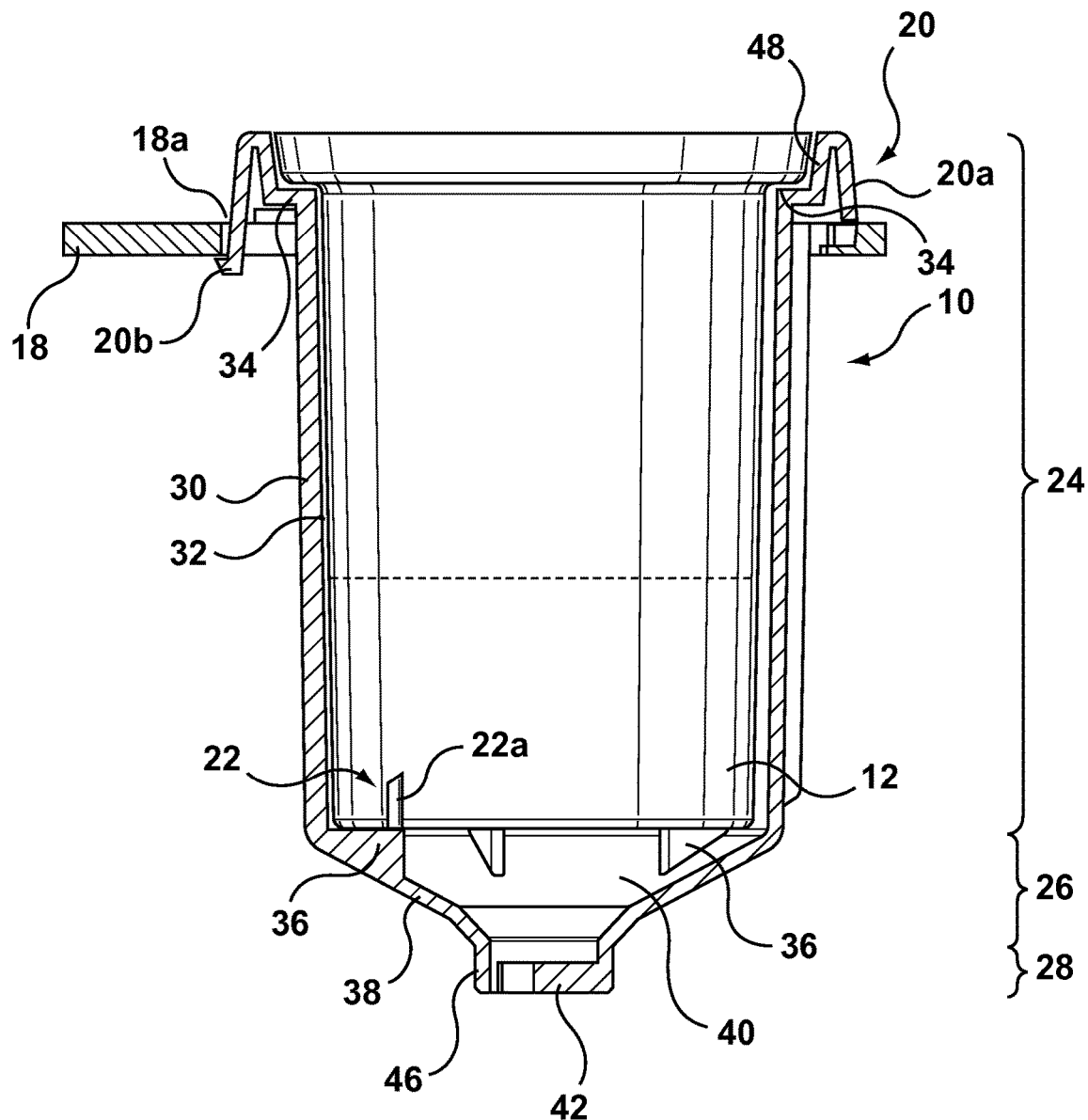
FIG. 3 is a vertical sectional view of the capsule housing as viewed along lines 3-3 of FIG. 2 with a capsule loaded into the capsule housing.

Capsule housing 10 as depicted in FIGS. 2 and 3 is adapted to receive a capsule 12, as shown in FIG. 3, having a larger volume than conventional capsules. Capsule housing 10 is adapted to be retrofitted to existing machines (and in particular a K-Cup™ capsule machine sold by Keurig™). Side wall 30 of capsule housing extends with little or no taper from seat 34 to base 36 to define a capsule containment portion 24 of optimal volume. Additional volume is obtained by defining a shoulder 48 above seat 34.

Referring to FIGS. 5-13, an adjustment system 50 is provided to adjust the configuration of capsule housing 10 to accommodate capsules 12 of different heights, shapes or diameters at a desired position within capsule housing 10.

Figure 5:
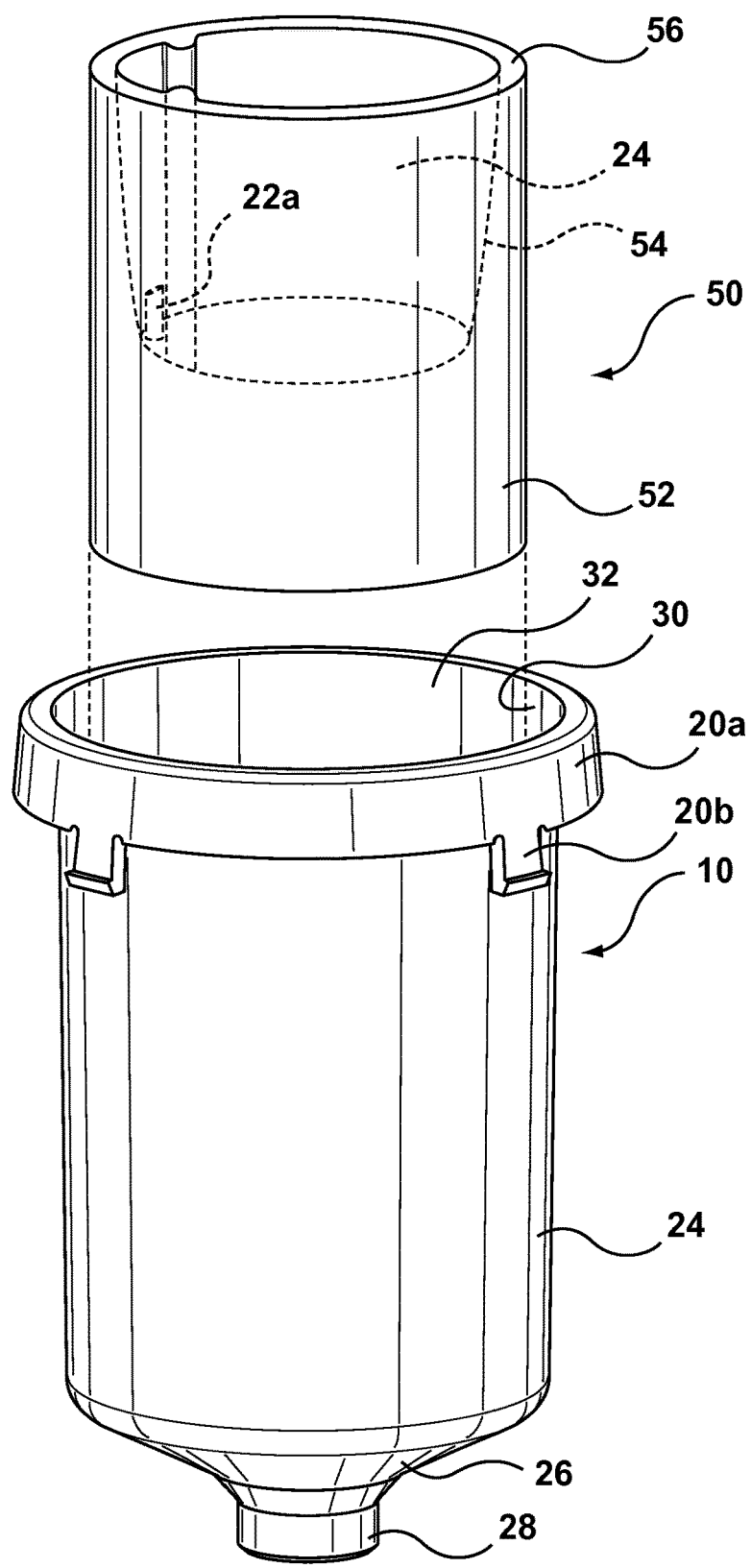
FIG. 5 is an exploded view of an alternative embodiment of a capsule housing in accordance with the present invention.
Figure 6:
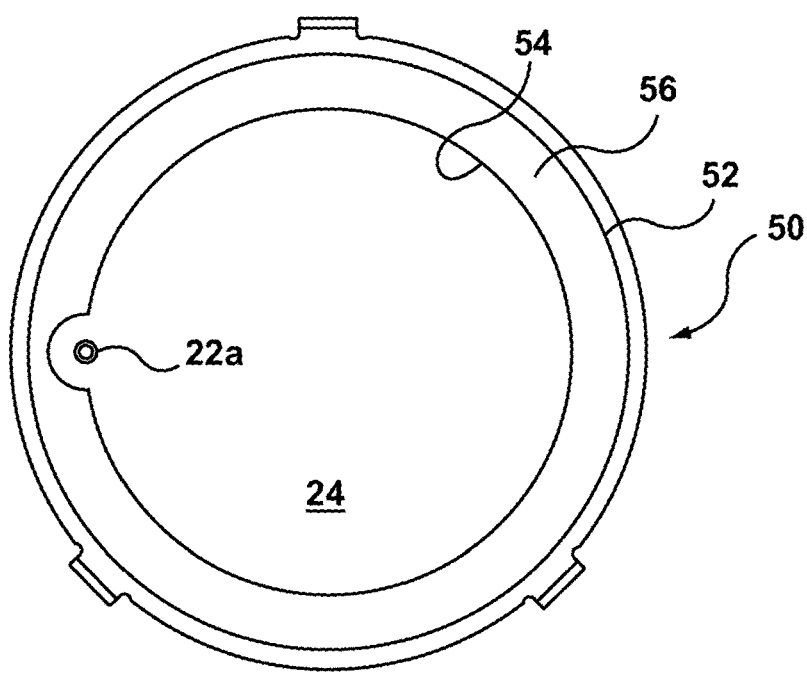
FIG. 6 is a top view of the capsule housing shown in FIG. 5.

Referring to FIGS. 5 and 6, adjustment system 50 may be provided to adjust the shape or diameter of seat 34 to accommodate capsules 12 of different shapes or diameters. Adjustment system 50 may comprise an insert 52 that may be removably disposed within capsule housing 10. Insert 52 includes side wall 54 and seat 56 that define a capsule containment portion 24 sized to accommodate a desired shape or diameter of capsule 12. (in this instance, insert 52 includes a containment portion 24 that is adapted to receive a Keurig™ Vue™ style of capsule having an irregular shape). Insert 52 may further include dispensing system 22, such as hollow probe 22a, disposed in a location suitable for dispensing product from the particular shape or diameter of capsule 12 intended for use with insert 52.

Figure 7:
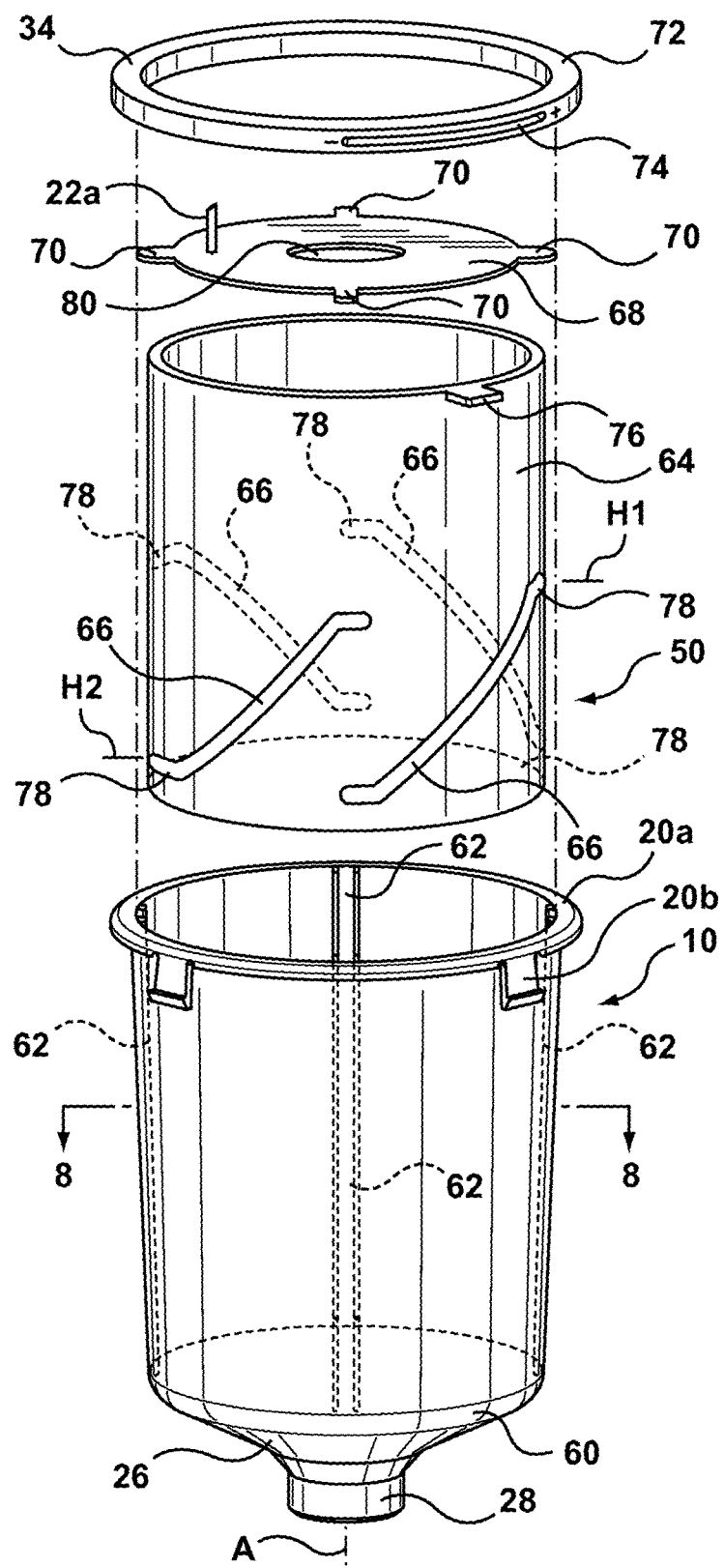
FIG. 7 is an exploded view of an alternative embodiment of a capsule housing in accordance with the present invention.
Figure 8:
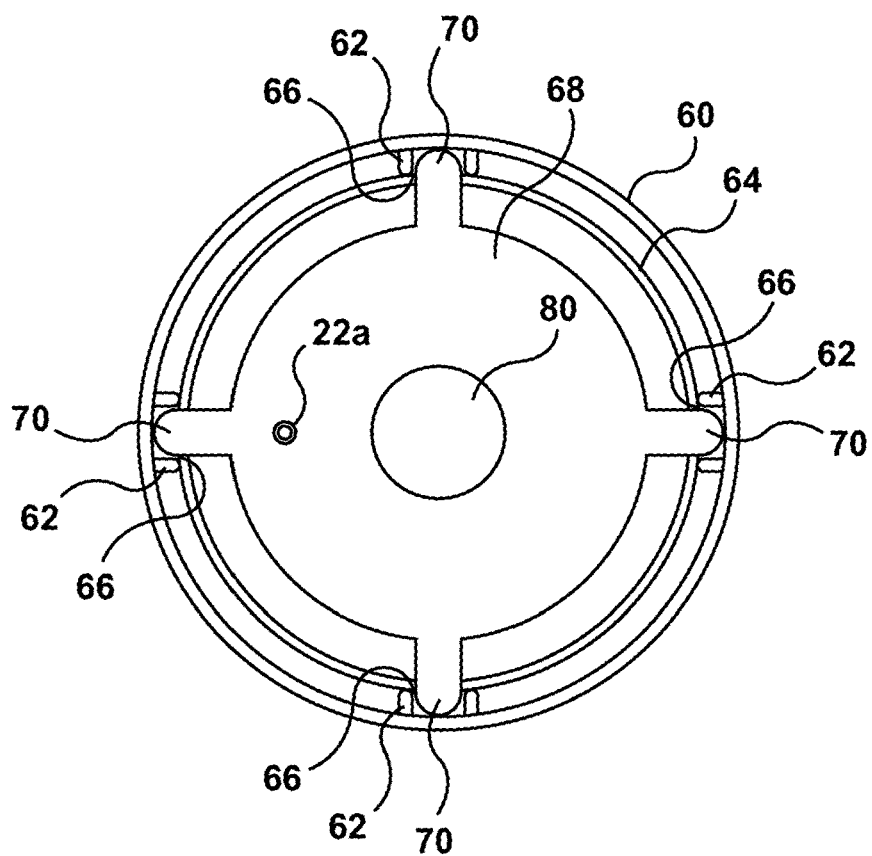
FIG. 8 is a sectional view of the capsule housing (no longer exploded) as viewed along lines 8-8 in FIG. 7.

Adjustment system 50 may also be provided to accommodate capsules 12 of different heights. Referring to FIGS. 7 and 8, one embodiment of adjustment system 50 for adjusting heights is shown. Capsule housing 10 comprises an outer sleeve 60 defining at least one outer track 62 and an inner sleeve 64 defining at least one inner track 66. Outer track 62 extends parallel to the axis A of capsule housing 10. Inner track 66 extends diagonally from a first height H1 to a second height H2. Tracks 62, 66 may be formed by raised bosses (such as outer track 62) or by a slot (such as inner track 66) or any other suitable structure for controlling movement over a desired path.

An adjustable base 68 is disposed within inner sleeve 64. Adjustable base 68 includes at least one runner 70 adapted for moving along both outer track 62 and inner track 66. In the embodiment depicted in FIGS. 7 and 8, four outer tracks 62 and four inner tracks 66 are provided with four corresponding runners 70 adapted to run in the tracks 62, 66.

A collar 72 is disposed over outer sleeve 60 to define seat 34 for supporting capsule 12. A slot 74 is defined in collar 72 for receiving a tab 76 extending from inner sleeve 64. Movement of tab 76 from one end of slot 74 to the other end of slot 74 causes inner sleeve 64 to rotate relative to outer sleeve 60. Because runner 70 is disposed in outer track 62, adjustable base 68 is prevented from rotating with inner sleeve 66. Rotation of inner sleeve 66 thus causes runner 70 to move along inner track 66 to move adjustable base 68 between first height H1 and second height H2. Inner track 66 further includes a ledge 78 at each end of track for supporting adjustable base 68 at first height H1 or second height H2 depending on positioning of tab 76.

Adjustable base 68 includes a dispensing system 22 such as hollow probe 22a. An aperture 80 is defined in adjustable base 68 to accommodate capsules 12 having an integral dispensing nozzle (not shown) rather than requiring dispensing probe 22a.

Figure 9:
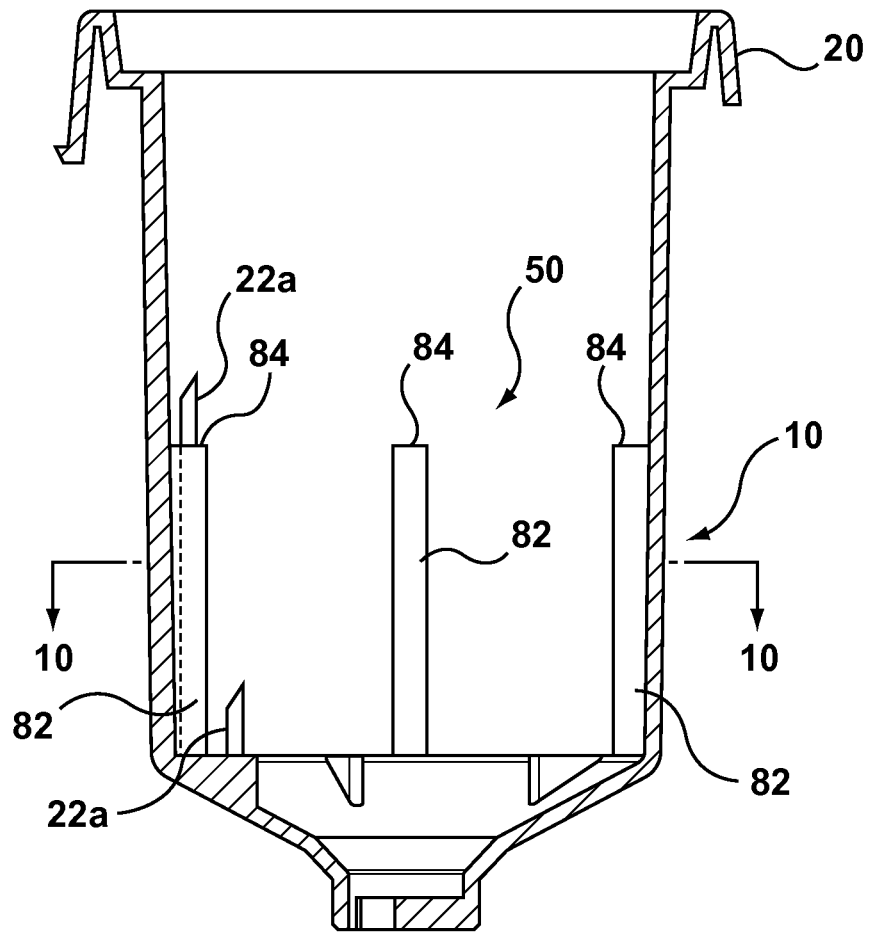
FIG. 9 is a vertical sectional view of an alternative embodiment of a capsule housing in accordance with the present invention.
Figure 10:
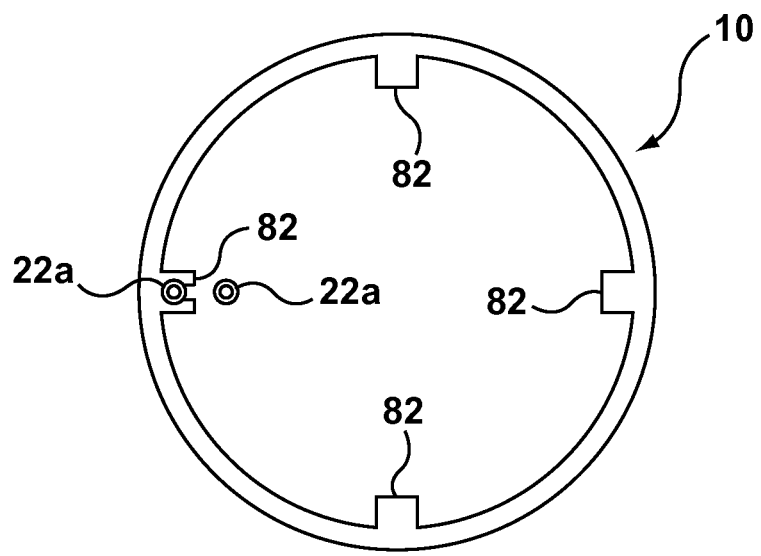
FIG. 10 is a cross sectional view of the alternative embodiment of capsule housing as viewed along lines 10-10 of FIG. 9.
Figure 11:
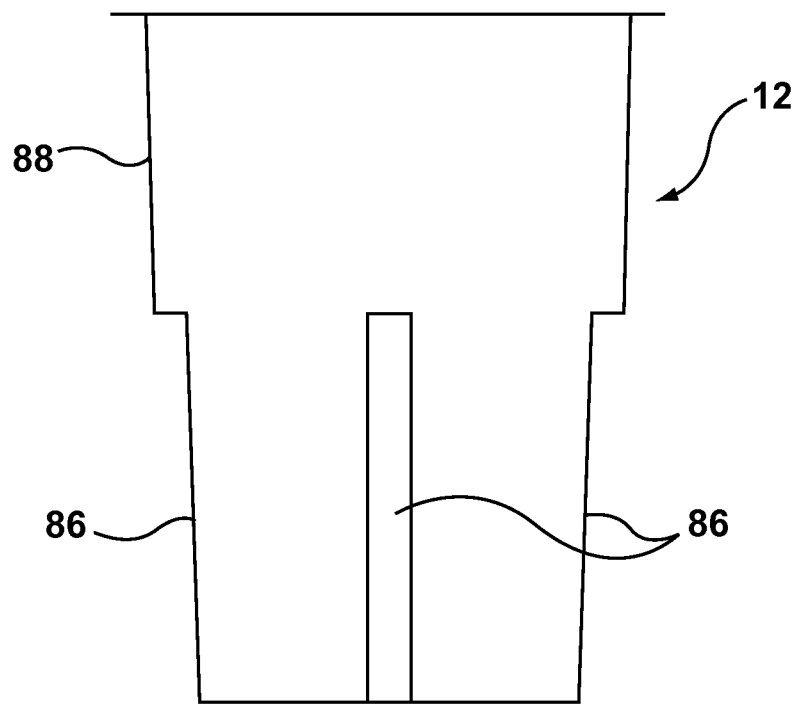
FIG. 11 is a side view of a capsule adapted for fitting into the capsule housing of FIGS. 9 and 10.

Referring to FIGS. 9-11, adjustment system 50 may instead comprise a plurality of support ribs 82 disposed in capsule containment portion 24. Support ribs 82 define a first support surface 84 for supporting smaller size capsules 12 of a first height, shape or diameter. Larger size capsules 12 may be configured with corresponding grooves 86 in their sidewall 88 to receive support ribs 82. Adjustment system 50 further comprises a base 36 for supporting such larger size capsules. Base 36 includes a dispensing system 22 with hollow probe 22a for piercing such larger size capsules. As a result, larger size capsules 12 may be rotatably inserted into capsule housing 10 until support ribs 82 are disposed in grooves 86 to allow capsule 12 to be lowered into capsule containment portion 24. It will be understood that adjustment system 50 may comprise a plurality of support ribs 82 with support surfaces 84 disposed at a plurality of heights or other dimensions (not shown) to support different sizes of capsules.

Figure 12:
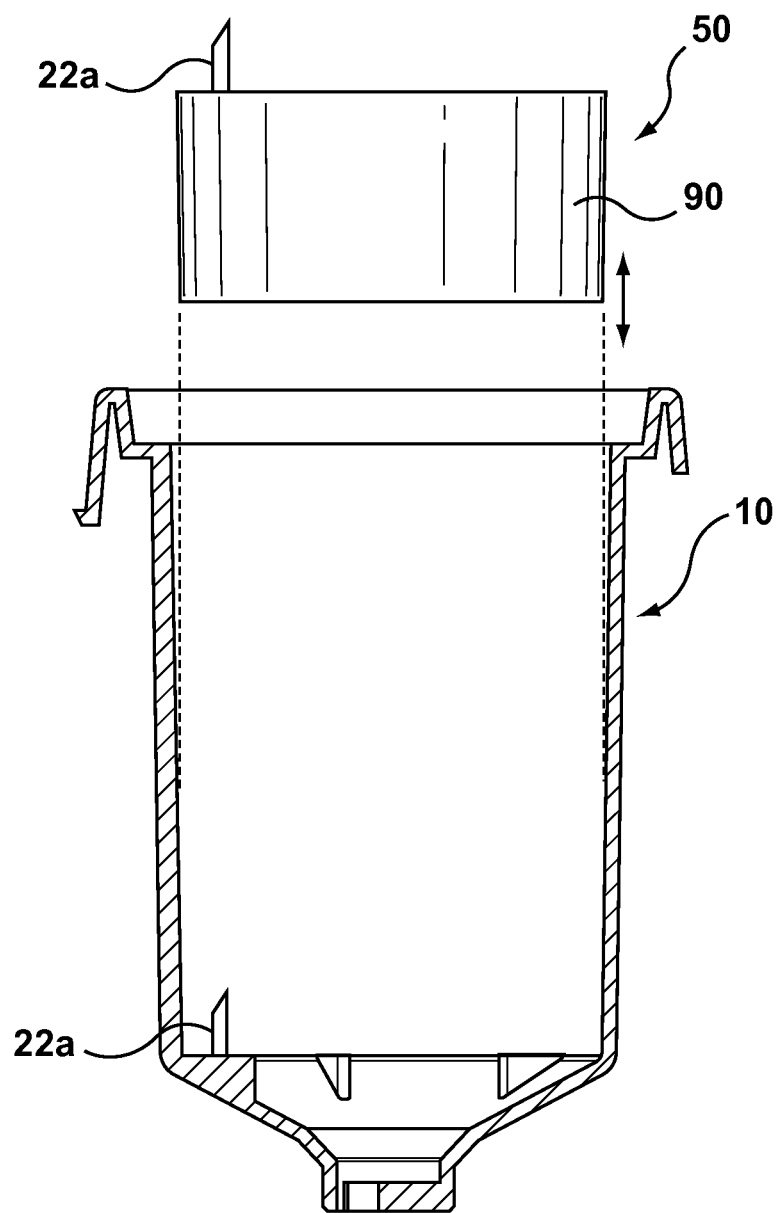
FIG. 12 is an exploded vertical sectional view of an alternative embodiment of a capsule housing in accordance with the present invention.

Referring to FIG. 12, height adjustment system 50 may instead comprise a removable insert 90 that may be disposed within capsule containment portion 24 to accommodate a different height or shape of capsule.

Figure 13:
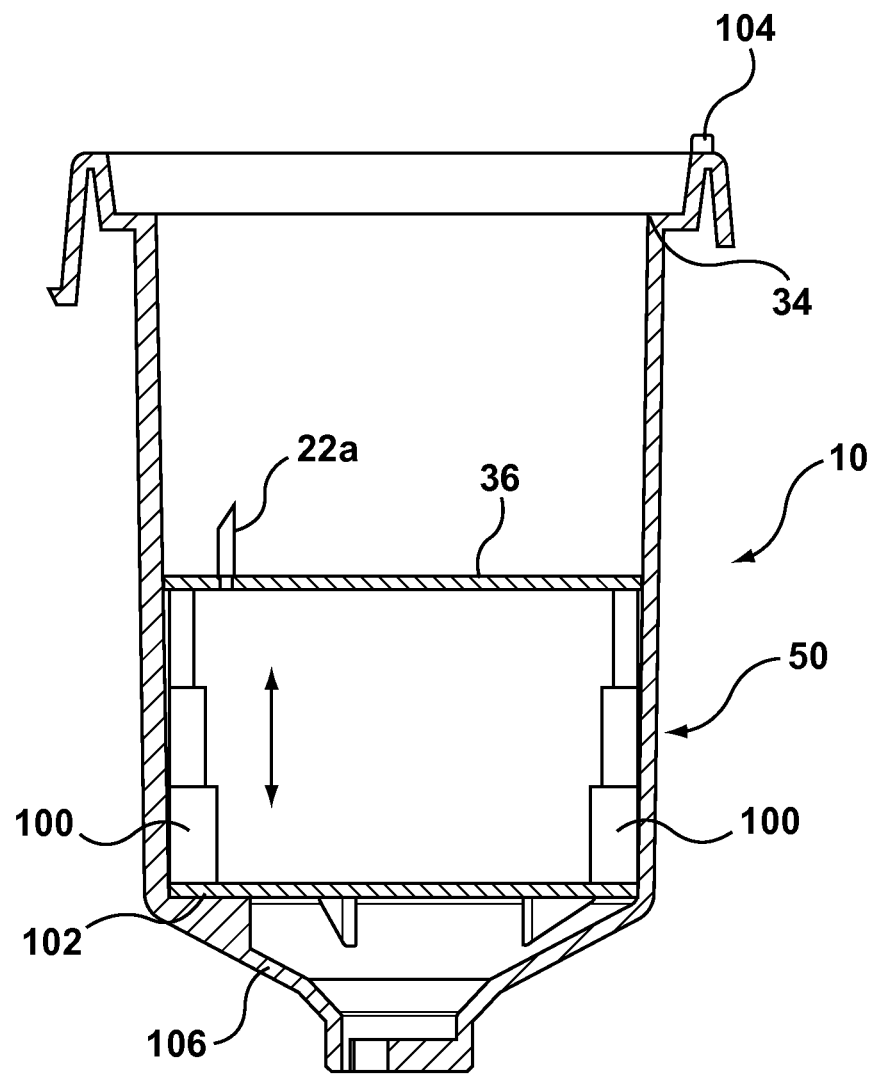
FIG. 13 is a vertical sectional view of an alternative embodiment of a capsule housing in accordance with the present invention.

Referring to FIG. 13, another embodiment of height adjustment system 50 is shown. In this embodiment, base 36 is disposed on a telescoping platform 100 that may be raised or lowered by a linear actuator 102. Linear actuator may be triggered by switch 104 disposed on seat 34. Linear actuator may be electrically powered by a battery 106 disposed in capsule housing 10 or it may be wired directly to the control system for machine 14. When switch 104 senses that capsule 12 has been disposed in capsule housing 10 and brew chamber has been closed then linear actuator is activated to move base 36 to a position where dispensing system 22 is activated. For example, base 36 may be moved to a position where probe 22a pierces capsule 12 to dispense product.

While the above description provides examples of one or more processes or apparatuses, it will be appreciated that other processes or apparatuses may be within the scope of the accompanying claims.

We claim:

1. A capsule housing for a machine that prepares a beverage product from a capsule, the capsule housing comprising:
    a capsule containment portion defining a cavity adapted for receiving a capsule;
    a dispensing system disposed in said capsule containment portion, said dispensing system being constructed and arranged to pierce a capsule to dispense the beverage product from said capsule;
    a product dispensing portion located downstream from said capsule containment portion for receiving the beverage product that is dispensed by said dispensing system, said product dispensing portion defining an opening adapted for dispensing the beverage product from said capsule housing to a desired receptacle; and
    an adjustment system constructed and arranged to adjust one or more dimensions of said capsule containment portion in order to adjust between receiving and piercing a first capsule with said dispensing system to dispense the beverage product from said capsule, said first capsule having a first set of one or more dimensions, and receiving and piercing a second capsule with said dispensing system to dispense the beverage product from said capsule, said second capsule having a second set of one or more dimensions, wherein said first set of one or more dimensions is different from said second set of one or more dimensions,
    wherein said adjustment system comprises at least one removable insert disposed in said capsule containment portion, said at least one removable insert defining a volume and being constructed and arranged to be inserted or removed from said capsule housing to accommodate different sizes of capsules when disposed in the volume.

2. The capsule housing of claim 1, further comprising a product collection portion disposed between said capsule containment portion and said product dispensing portion, said product collection portion defining a chamber for receiving the beverage product that is dispensed by said dispensing system and directing said beverage product to said product dispensing portion.

3. The capsule housing as claimed in claim 1, wherein said dispensing system comprises a probe that is adapted for piercing a portion of said capsule.

4. The capsule housing of claim 1 wherein said removable insert also includes said dispensing system.

5. The capsule housing of claim 1, wherein said at least one removable insert defines the capsule containment portion that is adapted to receive a desired capsule.

6. The capsule housing of claim 5 wherein the at least one removable insert also includes a dispensing system.

7. The capsule housing as claimed in claim 1, wherein said adjustment system is constructed and arranged to adjust said one or more dimensions of said capsule containment portion in order to adjust between receiving and piercing said first capsule having a first diameter and said second capsule having a second diameter that is different from said first diameter.

8. A capsule housing for a machine that prepares a beverage product from a capsule, the capsule housing comprising:
    a capsule containment portion defining a cavity adapted for receiving a capsule;
    a dispensing system disposed in said capsule containment portion, said dispensing system being constructed and arranged to pierce a capsule to dispense the beverage product from said capsule;
    a product dispensing portion located downstream from said capsule containment portion for receiving the beverage product that is dispensed by said dispensing system, said product dispensing portion defining an opening adapted for dispensing the beverage product from said capsule housing to a desired receptacle; and
    an adjustment system constructed and arranged to adjust one or more dimensions of said capsule containment portion in order to adjust between receiving and piercing a first capsule with said dispensing system to dispense the beverage product from said capsule, said first capsule having a first set of one or more dimensions, and receiving and piercing a second capsule with said dispensing system to dispense the beverage product from said capsule, said second capsule having a second set of one or more dimensions, wherein said first set of one or more dimensions is different from said second set of one or more dimensions,
    wherein said adjustment system comprises a base disposed within said capsule containment portion, said base being moveable between a plurality of positions to accommodate different sizes of capsules,
    wherein said base is disposed on a telescoping platform that may be raised or lowered between said plurality of positions.

9. The capsule housing of claim 8, wherein said base is moveable along one or more tracks disposed in said capsule housing.

10. The capsule of claim 9, wherein said capsule housing comprises an outer sleeve defining at least one outer track and an inner sleeve defining at least one inner track, and wherein said base includes at least one runner that is adapted to move along both said inner track and said outer track between said plurality of positions.

11. The capsule housing of claim 10, wherein said adjustment system further comprises said base disposed within said capsule containment portion, said base also including a dispensing system.

12. The capsule housing of claim 8 wherein said dispensing system is disposed on said base.

13. A capsule housing for a machine that prepares a beverage product from a capsule, the capsule housing comprising:
    a capsule containment portion defining a cavity adapted for receiving a capsule;
    a dispensing system disposed in said capsule containment portion, said dispensing system being constructed and arranged to pierce a capsule to dispense the beverage product from said capsule;
    a product dispensing portion located downstream from said capsule containment portion for receiving the beverage product that is dispensed by said dispensing system, said product dispensing portion defining an opening adapted for dispensing the beverage product from said capsule housing to a desired receptacle; and an adjustment system constructed and arranged to adjust one or more dimensions of said capsule containment portion in order to adjust between receiving and piercing a first capsule with said dispensing system to dispense the beverage product from said capsule, said first capsule having a first set of one or more dimensions, and receiving and piercing a second capsule with said dispensing system to dispense the beverage product from said capsule, said second capsule having a second set of one or more dimensions, wherein said first set of one or more dimensions is different from said second set of one or more dimensions, wherein said adjustment system comprises a plurality of support ribs disposed in said capsule containment portion, said support ribs defining a first support surface, for supporting said first capsule, and a base, for supporting said second capsule, said first support surface and said base each also supporting said dispensing system.

* * * * *